Patented Jan. 22, 1946

2,393,526

UNITED STATES PATENT OFFICE 2,393,526

ALKYL AROMATIC COMPOUNDS

Lawrence H. Flett, Hamburg, N. Y., assignor to Allied Chemical & Dye Corporation, a corporation of New York No Drawing. Application June 28, 1941, Serial No. 400,335

6 Claims. (Cl. 260—505)

This invention relates to new types of products and to methods for preparing them. It relates more particularly to new types of alkylated aromatic compounds and methods for their manufacture.

Alkylated aromatic compounds, having as substituents in the aromatic nucleus, introduced by alkylation, monovalent hydrocarbon radicals derived from a petroleum distillate (including aliphatic, cycloaliphatic and aralkyl hydrocarbon radicals), have heretofore been produced. Thus, sulfonated compounds of this type have been produced for use as detergents and surface-active agents.

One process for the manufacture of these products involves chlorinating a hydrocarbon mixture of the type of a petroleum distillate, preferably a paraffinic petroleum hydrocarbon distillate; condensing resulting chlorinated hydrocarbons with an aromatic compound with the aid of a condensation catalyst of the Friedel-Crafts type, such as anhydrous aluminum chloride or anhydrous zinc chloride, to form a mixture containing alkylated aromatic compounds having as substituents in the aromatic nucleus, introduced by alkylation, monovalent hydrocarbon radicals sulfonating resulting mixed alkylated aromatic compounds; and recovering the resulting mixed sulfonic acids, preferably in the form of their salts, such as their salts with alkali metals.

It is obvious that in order to produce superior products of the above type it is important to make certain that the hydrocarbon groups introduced by alkylation are of the desired character. It is also important, if the object is to prepare products adapted for general use, to obtain the mixed alkylated aromatic sulfonates substantially free from the hydrocarbon mixture (e. g., the kerosene or "white oil" fraction) used in manufacturing the products.

In the manufacture of mixed alkylated aromatic sulfonates having the desired type of hydrocarbon substituent and therefore having desirable properties, the manner in which the chlorination of the hydrocarbon mixture is carried out is important. References in the literature disclose that when chlorinating a hydrocarbon mixture for the purpose of finally replacing a hydrogen atom of the hydrocarbon molecules with some other radical such as the hydroxyl group, the desired products are obtained in the best yields when, at the end of the chlorination reaction, the amount of organically combined chlorine in the chlorinated hydrocarbon mixture is much less than that which corresponds to one atom of chlorine per molecule of hydrocarbon. That chlorination of this nature, which is conveniently termed "underchlorination," should result in a high proportion of desired products from hydrocarbon mixtures is also supported by theoretical considerations. In processes wherein a hydrocarbon mixture is chlorinated so as to obtain from the mixture radicals of the hydrocarbon molecules, it has been considered that the useful products are obtained substantially entirely from the monochlorinated molecules. The polychlorinated molecules were regarded as undesired impurities which led to the formation of unwanted by-products and whose production was to be avoided. It is known that the first chlorine atom introduced into a hydrocarbon molecule at least does not seriously retard the introduction of further chlorine atoms into this molecule. For this reason, as chlorination is continued up to and beyond the point which corresponds to the introduction of one chlorine atom for each molecule of hydrocarbons, it was to be expected that a large proportion of the hydrocarbons present in the mixture would be converted into undesirable polychlorides. Thus, it was to be expected that while at first, say at the point where the chlorine which has become combined organically in the mixture corresponds to about one-fifth of the amount of chlorine which would be so combined if each molecule of hydrocarbon in the mixture were converted to a monochlor hydrocarbon, the chlorinated hydrocarbons in the mixture would be predominantly monochlorides, as the chlorination proceeded a proportion of these monochlorides would be converted into polychlorides. Although it would be expected that continued chlorination would convert some of the unchlorinated hydrocarbons to the desired monochlorides, it would be expected that this action would be accompanied by the conversion of the monochlorides first formed into the undesired polychlorides, resulting in a final mixture containing a high proportion of the polychlorides. On condensing the mixture containing the polychlorides with an aromatic compound, it would be expected that the condensation taking place between the polychlorides and the aromatic compound would defeat the securing of desirable hydrocarbon substituted aromatic sulfonates upon the eventual sulfonation of the condensation products.

As is pointed out in my application Serial No. 329,830, filed April 15, 1940, now U. S. Patent 2,247,365, issued July 1, 1941, of which this application is a continuation-in-part, I have discovered that the foregoing teachings and theoretical considerations do not hold true in the above-outlined general process for the manufacture of mixed alkylated aromatic sulfonates which are valuable for their detergent properties. Thus, as is disclosed and claimed in my aforesaid application Serial No. 329,830, I have found, by chlorinating a hydrocarbon mixture of the type of a petroleum distillate, such as a kerosene or "white oil" fraction of petroleum, and preferably a paraffinic petroleum hydrocarbon distillate, to such an extent that the amount of chlorine which has become combined organically in the mixture is more than that which would be so combined if each hydrocarbon molecule present in the mixture were converted to its corresponding monochloride, that a chlorinated mixture is obtained which can be used successfully for the production of desired mixed hydrocarbon-substituted aromatic sulfonates with exceptional surface-active properties. Hereinafter a chlorinated mixture containing an amount of organically combined chlorine which exceeds that which would be present if the mixture consisted of monochlorinated hydrocarbons only is said to be over-chlorinated. It has further been found that by using an overchlorinated hydrocarbon mixture not only is it possible to obtain desirable mixed hydrocarbon-substituted aromatic sulfonates, but these sulfonates are obtainable in greater yields, based on the amount of hydrocarbon mixture employed, than when an underchlorinated hydrocarbon mixture is used. Further, it has been determined that the polychlorinated hydrocarbon constituents are not undesirable but condense with the aromatic compound to produce hydrocarbon-substituted aromatic compounds in which two non-aromatic carbon atoms of a hydrocarbon radical introduced by alkylation are linked directly to two adjacent carbon atoms of the aromatic nucleus. Thus, it has been determined that when a hydrocarbon mixture of the type of a petroleum distillate is chlorinated to a degree which may be said to correspond to "more than 100 per cent chlorination" and preferably "not more than 200 per cent chlorination" and the resulting chlorinated hydrocarbon mixture is condensed with an aromatic compound, preferably a mononuclear aromatic compound, and especially benzene, mixtures of hydrocarbon-substituted aromatic compounds are produced which include, in addition to hydrocarbon-substituted aromatic compounds in which a single non-aromatic carbon atom of a hydrocarbon radical is linked directly to a carbon atom of the aromatic nucleus, hydrocarbon-substituted aromatic compounds in which two non-aromatic carbon atoms of a hydrocarbon radical introduced by alkylation are linked directly to two adjacent carbon atoms of the aromatic nucleus (termed for convenience "cyclo-alkylene-aromatic" compounds), and that when such mixtures are sulfonated "cyclo-alkylene-aromatic" sulfonates are formed which contribute greatly to the surface-active properties of the mixtures. Throughout this specification and the claims, per cent chlorination is on a molar basis; it refers to the per cent ratio between the actual increase in weight due to chlorination of an amount of hydrocarbon distillate corresponding to the average molecular weight of the hydrocarbons in the distillate and the expected increase in weight of the same amount and kind of hydrocarbon distillate if every hydrocarbon in the amount of hydrocarbon distillate were converted to its corresponding monochlor hydrocarbon. Thus, the per cent chlorination may be expressed by the formula:

$$\frac{I \times 100}{34.5}$$

where 34.5 represents the increase in weight of an average molar quantity of hydrocarbon mixture if all the hydrocarbons in this quantity of mixture were converted to monochlor hydrocarbons only and I represents the actual increase in weight of an average molar quantity of hydrocarbon mixture due to chlorine which is caused to become organically combined in the hydrocarbons of the quantity of mixture by the chlorination.

In contrast to the prior art which has emphasized the importance of making detergents of the alkylated aromatic sulfonate type from chlorinated hydrocarbons which have been chlorinated to a lesser degree than 100 per cent chlorination, specifically with the object of obtaining only monochlor hydrocarbons, I have found that high quality detergents of the alkylated aryl sulfonate type, and which contain substantial amounts of the said novel cyclo-alkylene-aromatic sulfonates, can be made from chlorinated hydrocarbon mixtures which are chlorinated to a much higher degree and contain large proportions of polychlorinated hydrocarbons. Thus my invention greatly improves the efficiency of conversion of suitable petroleum hydrocarbon fractions into high quality detergent products.

In accordance with the invention, the hydrocarbon mixture is chlorinated to a degree corresponding to more than 100 per cent, and preferably not more than 200 per cent chlorination. Within these limits it is preferred to chlorinate the hydrocarbon mixture to a degree corresponding to not more than 175 per cent chlorination. Especially valuable results are obtained when the chlorination is carried out to a degree corresponding to from 110 per cent to 150 per cent chlorination, or more specifically to a degree corresponding to about 120 per cent chlorination. By chlorinating to from 110 to 150 per cent chlorination, nearly maximum yields of high-quality products are obtained, and the consumption of chlorine is kept at a reasonable level.

The hydrocarbon mixtures employed in the present process are complex mixtures, such as petroleum distillates, whose compositions are not definitely known. The approximate composition of petroleum distillates is determined by reference to the boiling points and the other physical properties of the compositions. Ordinarily, the petroleum distillates employed in the making of the side-chain aromatic compounds will boil over ranges, the lower boiling points of which are not below 80° C. at atmospheric pressure, and the upper boiling points of which are not above 350° C. at 25 mm. absolute pressure. For the manufacture of products designed for general detergent use it is preferred to employ petroleum fractions derived from Pennsylvania, or Mount Pleasant, Michigan, type petroleums which fractions boil for the most part within the range 180° to 300° C., and are preferably composed predominantly of saturated hydrocarbons which boil within the range of 180° to 280° C. Thus the preferred hydrocarbon mixtures are composed predominantly of saturated hydrocarbons, including saturated acyclic and saturated alicyclic hydrocarbons, containing 7 to 35 carbon atoms or, better, an average of 10 to 19 carbon atoms, and especially an average of 12 to 16 carbon atoms per molecule.

As above disclosed, the present invention includes compounds of a class not heretofore known to the art. Such compounds are characterized by a structure in which two non-aromatic carbon atoms forming part of a hydrocarbon chain are linked directly to two nuclear carbon atoms of a single aromatic nucleus. They may be prepared by condensing a polychlorinated (di- or higher chlorinated) aliphatic hydrocarbon, or a mixture of chlorinated hydrocarbons comprising polychlorinated aliphatic hydrocarbons, with suitable aromatic compounds.

The broad scope of my invention includes compounds and mixtures of compounds having the general formula:

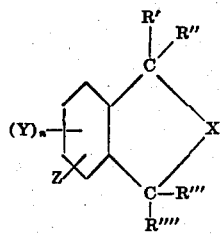

wherein the grouping:

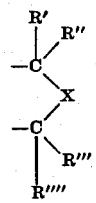

represents a radical derived from a dihalogenated aliphatic hydrocarbon containing at least 7 carbon atoms and not more than 35 carbon atoms wherein R', R'', R''' and R'''' represent hydrogen or the same or different aliphatic, aromatic or cycloaliphatic hydrocarbon radicals, at least one of which is a hydrocarbon radical; X represents a direct carbon to carbon bond or an alkylene group; (Y)$_n$ represents hydrogen of the benzene nucleus, or one, two, or three monovalent substituents, all of which need not be alike (e. g., OH, halogen, nitro, amino, aryl, or carboxyl groups, alkyl groups containing not over 6 carbon atoms, alkoxy groups containing not over 6 carbon atoms, etc.); and Z represents one hydrogen of the benzene nucleus, or a sulfonate group which replaces said hydrogen and may be a free sulfonic acid group or a salt thereof (including metal, ammonium and organic base salts) which make the compound water-soluble. Preferably the said grouping—

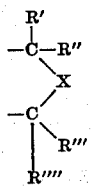

contains more than 9 carbon atoms, and not more than 20 carbon atoms, and particularly 12 to 18 carbon atoms.

It is emphasized that the formulas given above include products which are mixtures of compounds differing among themselves chiefly by various configurations of the grouping:

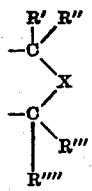

This grouping has a wide range of configurations in those novel products of this invention which are prepared by using petroleum fractions as sources of the grouping.

The invention will be illustrated by the following examples. It will be realized by those skilled in the art that the invention is not limited thereto except as indicated in the appended patent claims. The parts are by weight, the temperatures are in degrees Centigrade and the pressure is atmospheric, unless otherwise indicated. For convenience, where a kerosene fraction of petroleum is used in the processes disclosed in the examples, the product obtained by chlorinating this fraction is termed "keryl chloride" and the product obtained by condensing the keryl chloride with benzene, for example, is termed "keryl benzene." It will be understood that the specific character of the keryl chlorides and keryl benzenes or other keryl aryl products will be dependent upon the particular kerosene used and the manner in which the process is carried out.

*Example 1.*—1000 parts of a kerosene fraction of Pennsylvania petroleum boiling over the range 186° to 291°, with 80 per cent of the distillate boiling between 200° and about 265°, were filtered into a closed nickel-clad vessel fitted with a nickel agitator. 0.4 part of iodine was dissolved in the agitated kerosene fraction. Chlorine gas, filtered through a porous earthenware plate, was run at the rate of about 3 parts per minute into the liquid charge at a temperature of 55° to 60° until the specific gravity of the kerosene had increased from about 0.790 to 0.920. This chlorination period was about 2 hours.

1000 parts of benzene and 25 parts of anhydrous aluminum chloride were charged into a glass flask fitted with a glass agitator. 500 parts of the chlorinated kerosene were then run in with agitation during the course of 20 minutes, the temperature being about 30°. The agitated mixture in the flask was heated to 45° and maintained at that temperature for about 1½ hours. The reaction mass was transferred to a separatory funnel and tar was allowed to separate from the crude alkylated benzene for at least two hours. The lower, tar layer was withdrawn and discarded.

The crude alkylated benzene contained considerable free benzene, which was removed by stripping the crude alkylated benzene first to 100°–105° at atmospheric pressure and then in vacuo to 85° at 30–40 mm. absolute pressure. The residual material weighing about 450 parts was distilled at 4 mm. pressure. The first distillate forming about 7 per cent of the distilland was removed and consisted mainly of kerosene. The distillation was then continued and the distillate obtained from that point until the boiling point of the distilland was 234° at 4 mm. was collected as alkylated benzene.

100 parts of the resulting alkylated benzene distillate were agitated for 45 minutes with 19 parts of 100 per cent sulfuric acid; the mix was allowed to settle for 15 minutes and the acid layer was withdrawn.

The acid treated alkylated benzene was then treated with 120 parts of 100 per cent sulfuric acid in a glass vessel. After agitating without warming for 15 minutes, the temperature of the mixture was raised to 55 to 60° and held there with continued agitation for 1 hour. The sulfonation mixture was allowed to settle for 1 hour. Three distinct layers were formed. The middle, sulfonic acid layer was separated from the other layers and drowned in 500 parts of water containing 100 parts of cracked ice, the drowned mass was neutralized with 50 per cent aqueous caustic soda, and dried on a rotary drum drier.

*Example 2.*—10,620 lbs. Pennsylvania kerosene (having a specific gravity of 0.788 at 24° and boiling range 185° to 275°) were filtered through porous stoneware into a lead lined kettle fitted with lead-covered agitator, thermometer well and other accessories. 4.4 pounds of iodine were dissolved in the agitated kerosene charge which was then warmed to about 60° and maintained between 60° and 70° while chlorine gas, also filtered through porous stoneware, was passed into the liquid at an average rate of about 300 pounds per hour, until the specific gravity of the chlorinated kerosene was 0.918 at 24°, corresponding with 115 per cent monochlorination of the kerosene. The amount of chlorine required for the purpose was about 4825 lbs. The final clorinated kerosene mixture weighed 12,834 lbs. The chlorinated hydrocarbon thus obtained was condensed in portions with benzene as follows:

A mixture of 13,272 lbs. of benzene and 332 lbs. of anhydrous aluminum chloride was agitated and 6636 lbs. of the chlorinated kerosene mixture were added thereto over a period of three hours, during which the temperature of the mass rose to about 35°. The mixture was then heated to 45° and held there for about 1½ hours. Agitation was then stopped, the mixture was allowed to stand for about 2 hours; thereafter the lower tarry layer was withdrawn. The upper layer was conveyed to a stripping kettle in which the liquid was stripped of low-boiling hydrocarbons, chiefly benzene, by boiling the liquid until its temperature reached 150° at atmospheric pressure, then reducing the pressure in the distilling system to a pressure of 3 to 4 inches of mercury absolute pressure and continuing the boiling without further supply of heat for about one hour, until the temperature of the distilland was about 120°. The material left after this stripping was distilled in vacuo until about 7 per cent of the charge in the still had been removed as distillate. The remaining distilland was distilled, and distillate therefrom was collected separately until the boiling point of the distilland was 250° at 14 mm. mercury pressure. This last distillate was chiefly keryl benzene, the condensation product of the chlorinated hydrocarbons of the kerosene fraction and the benzene.

The kerylbenzene was treated with 100 per cent sulfuric acid by mixing it with about 15 per cent of its weight of the acid and agitating the mixture for about 1 hour at about 40°. The mixture was allowed to stand about ½ hour to permit separation of the acid, which constituted the lower layer and was withdrawn.

The upper acid-treated layer of kerylbenzene was mixed with about 1.25 times its weight of 100 per cent sulfuric acid at a temperature between 30° and 35°. The mixture was then warmed to 55° and agitated at that temperature for 1 hour. It was then allowed to stand for 2 hours during which time three layers of material separated. The top layer was chiefly unsulfonated material; the middle layer was chiefly sulfonated kerylbenzene; and the bottom layer was spent sulfuric acid. The middle layer was separated from the others; drowned in ice water; neutralized with caustic soda (aqueous solution), and dried on a rotary drum drier.

*Example 3.—Part 1.*—Chlorine is passed into 400 parts of a kerosene boiling from about 195° to about 300° (and boiling for the most part from about 225° to 275°), having a specific gravity of 0.799 at 24°, containing about 5.6 per cent of unsaturated hydrocarbons, and having a probable carbon content ranging from 11 to 18 carbon atoms and a probable average content of about 13.4 carbon atoms, at 50° in diffused light until there is an increase of weight of 111 parts, 2 parts of which are due to dissolved hydrogen chloride. The resulting product comprises unchlorinated hydrocarbon in admixture with mono- di- and polychlorinated hydrocarbons, the average chlorine content of the mixture being equivalent to about one and one-half atoms of chlorine per molecule of hydrocarbon having the stated carbon content.

*Part 2.*—150 parts of the chlorinated mixture produced in Part 1 of this example are slowly added to an agitated mixture of 200 parts of phenol and 5 parts of anhydrous zinc chloride at 75°, and the temperature is maintained at 75° for about 30 minutes after all the chlorinated mixture has been added. The temperature of the mixture is then raised and maintained at 135° for 2.5 hours. 5 parts of zinc dust are then added, and after one hour another 5 parts of zinc dust are added, the temperature being maintained during this addition, and for about 3 hours afterward, at 135°. The reaction mixture is cooled, treated with water, and the oil is separated from the water and residual zinc dust and fractionally distilled. The fraction boiling from 140° to 250° at 4 mm. pressure is separately collected. The product, which is an oil showing fluorescence under ultra-violet light, insoluble in water, soluble in alcohol, gasoline and other organic solvents, is comprised mainly of a mixture of alkylated phenols.

*Example 4.*—10 parts of an alkylated phenol mixture obtained by a process such as is described in Example 3 are stirred and thereto 10 parts of sulfuric acid monohydrate (100 per cent sulfuric acid) are added slowly so that the temperature of the reaction mixture does not exceed about 30° to 35°. The sulfonation mixture is then warmed to 40° and held at that tempertaure until a sample is completely soluble in neutral, acid and alkaline water, and/or does not precipitate calcium salts from a calcium chloride solution containing the equivalent of 0.224 gram calcium oxide per liter (30 to 90 minutes). The solution is sometimes slightly turbid due to the presence of insoluble impurities. The sulfonation mass is then diluted with water to about 100 parts by weight and neutralized with sodium or potassium hydroxide, or their equivalents. The neutral solution of sulfonates is filtered and evaporated to dryness.

*Example 5.*—A mixture of alkylated cresols is prepared by condensing crude cresylic acid with the aid of zinc chloride as condensing agent with a mixture of alkyl chlorides obtained by reacting a saturated petroleum distillate having a boiling range from 220° to 240° C. and containing an aliphatic hydrocarbon chain having about 13 to 14 carbon atoms with chlorine until its weight has increased approximately 18.5%. 100 parts by weight of this alkylated cresol mixture is agitated rapidly while 128 parts of 100% sulfuric acid are added with temperature of the sulfonation mixture controlled to remain around 30° C. throughout the addition. The sulfonation mass is then warmed to 75° C. and held there until a sample is completely soluble in water and does not precipitate calcium salts (about 30 minutes). The sulfonation mass is then diluted, neutralized with caustic soda, filtered and evaporated to dryness.

*Example 6.*—The petroleum fraction used in this example is known commercially as "white oil" and is a purified distillate of which under an absolute pressure of 10 mm. of mercury more than 98 per cent distils over the range 157° to 278° C. and more than 85 per cent distils over the range 195° to 260° C. For convenience, the condensation products from white oil and benzene are called "white-oil-benzene" compounds.

2270 lbs. of white oil were agitated in a vessel lined with lead. 1.75 lbs. of iodine were dissolved in the agitated white oil. Chlorine gas was then passed through the oil with continued agitation until the specific gravity of the sample showed an increase of 0.09 over that of the original white oil. During chlorination, the temperature was adjusted to 70° to 86° C. by suitably heating or cooling the batch. The chlorinated white oil weighed 2651 lbs. The degree of chlorination corresponded to about 150% chlorination.

617 lbs. of benzene and 62 lbs. of anhydrous aluminum chloride were agitated in an Allegheny metal kettle, warmed to 35° to 40° C. and held at that temperature for about an hour and a quarter during which period 617 lbs. of the chlorinated white oil (prepared as above described) were run in. The agitated mixture was then warmed at 55° C. and agitated at 55° to 59° C. for an hour. The agitation was then stopped and the batch was allowed to settle for about 18 hours. During this period, the batch was allowed to cool down to about 30° C. Some 248 lbs. of tar which settled out were discarded.

The crude condensation product was transferred to a stripping kettle, and unreacted benzene was stripped off by gradually heating the batch to 150° C. and holding it at that temperature until distillation ceased and then simultaneously increasing the vacuum in the still to approximately 27 inches of mercury and gradually heating the distilland to about 175° C. The remaining stripped white-oil-benzene weighed 433 lbs.

200 lbs. of stripped white-oil-benzene were charged into an enamel-lined kettle fitted with an enameled agitator and other suitable accessories. The batch was then cooled to 16° C. and 266 lbs. of 100 per cent sulfuric acid were run in during an hour and a quarter. The temperature was then raised to 50° to 55° C. and held there for about an hour and a half. 120 lbs. of water were then added slowly to the batch, which was cooled so that the final and highest temperature thereof was 66° C. To the mixture, 80 lbs. of Stoddard solvent were added. After agitating the batch for 15 minutes, and then allowing it to stand for one hour, the lower spent acid layer was drawn off. Then 80 lbs. more of Stoddard solvent were added to the batch which was agitated for 15 minutes and allowed to stand for about 18 hours before the rest of the spent acid was drawn off.

The sulfonation mixture was then neutralized with 50 per cent aqueous caustic soda solution. The resulting product, which was a solution of white-oil-benzene-sodium-sulfonate in Stoddard solvent, is adapted for use in preparing highly efficient detergent compositions for dry cleaning.

*Example 7.*—A kerosene fraction of Pennsylvania petroleum distillate having a boiling range of about 172° to about 250° C., which, on the basis of its source and properties, was considered to be a mixture of hydrocarbons (mainly open-chain aliphatic hydrocarbons) having a range from about 10 to about 15.5 carbon atoms per molecule, was chlorinated in diffused daylight at a temperature between 50° and 60° C. until about 21 parts of chlorine had been absorbed per 100 parts of kerosene (corresponding to about 109 per cent chlorination). 200 parts of this mixture of chlorinated hydrocarbons were reacted at ordinary temperature with 150 parts of monochlorbenzene and 20 parts of anhydrous aluminum chloride. The temperature of the mixture was allowed to rise to about 60° C. with agitation and this agitation was continued for about one additional hour after this temperature was reached. The mixture was allowed to stand and separate into two layers of which the upper was decanted, washed with dilute hydrochloric acid and distilled until a vapor temperature of 120° C. at 5 mm. was reached. The residue (85 parts) was an amber-colored oil comprising chiefly a mixture of alkylated chlorbenzenes in which the hydrocarbon groups introduced by alkylation contained from about 10 to 15.5 carbon atoms. 20 parts of the oil were sulfonated by mixing it with 25½ parts of 26° Bé. oleum at a temperature from about 10° to 15° C. for about 3 hours. The mixture was then heated to 40° to 55° C., where it was held for about one-half hour. The mixture was then diluted by drowning it in 6 to 7 times its weight of ice and water, neutralized with concentrated aqueous caustic soda and dried. The resulting product was an almost white solid soluble in water to form substantially colorless solutions having desirable wetting and washing properties. The product was chiefly a mixture of nuclearly alkylated chlorbenzenes in which the hydrocarbon groups introduced by alkylation contained from about 10 to about 15.5 carbon atoms.

*Example 8.*—*Part 1.*—Chlorine was passed into a kerosene (a purified Pennsylvania petroleum distillate) which boiled from 245° to 315° C., and of which 90 per cent distilled between 260° and 305° C., and had a specific gravity of 0.815, contained in a closed, lead-lined vessel which was equipped with a vent for hydrogen chloride produced by the chlorination. The chlorination was carried out in the dark, but to facilitate the chlorination the kerosene initially contained about 0.45 part of iodine per 1000 parts of kerosene. The temperature of the reaction mass was preferably maintained at about 45° to 50° C. The introduction of chlorine was continued until the weight of the mass increased to an extent which corresponded substantially with 115 per cent chlorination. The specific gravity of the reaction mixture reached about 0.915.

*Part 2.*—300 parts of the above chlorinated kerosene were mixed with 30 parts of anhydrous aluminum chloride and 150 parts of commercial diphenyl. The mixture was agitated under reflux at room temperature (that is, at about 15° to 30° C.) for about one hour and thereafter at about 75° C. for about one and a half hours. The mass was then cooled to about 20° to 30° C. and poured into a mixture of 600 parts of ice water and 30 parts of commercial muriatic acid. The aluminum salts dissolved in the cold dilute acid while the organic matter, which contained the alkylated diphenyl compounds, was precipitated in a semi-liquid, pasty form. Small amounts of benzene and/or ether were added to the agitated aqueous mixture to dissolve the organic products. Upon standing, the mixture separated into an upper layer which was a solution of the organic matter in the organic solvent, and a lower aqueous acid layer which was withdrawn and discarded. The benzol and/or ether solution of organic matter was washed with water until it was reasonably free of acid, and was then distilled in vacuo. The fraction of the distillate which boiled at about 170° to about 260° C. at 5 mm. pressure was collected separately. It was a light-yellow viscous oil which was insoluble in water, but soluble in benzene and in ether. It was a mixture comprised chiefly of alkylated diphenyl compounds in which the hydrocarbon groups introduced by alkylation corresponded with the kerosene hydrocarbons employed. It also contained some chlor-alkyl diphenyl compounds derived from the dichlor hydrocarbons.

*Part 3.*—25 parts of the oil obtained according to Part 2 of this example were mixed with 15 parts of 100 per cent sulfuric acid and stirred at about 90° C. for about 20 minutes, or until a 1 cc. sample was practically completely soluble in about 10 ccs. of water at about 25° C. The sulfonation mass was poured into 300 parts of water and the aqueous acid mixture was neutralized with caustic alkali or a water-soluble carbonate (e. g., sodium carbonate), and the resulting neutral solution was dried. The product was chiefly a mixture of the salts (e. g., alkali metal salts) of alkylated-diphenyl sulfonic acids. It was a light-brown to white solid which was soluble in water, and in aqueous solutions of mineral acids and of water-soluble alkalies.

*Example 9.*—*Part A.*—To an agitated mixture mixture of 1000 grams of commercial lauryl alcohol and 60 grams Supercel (commercial diatomaceous earth), 225 grams of phosphorus pentoxide were added in small portions during the course of about 1½ hours. Considerable heat was evolved. After adding the last portion of phosphorus pentoxide, the mixture was agitated for 3 hours longer. The reaction mass was allowed to settle and the liquid portion decanted from the phosphoric acid sludge. The crude product was distilled under an absolute pressure of about 10 millimeters. The product was redistilled at atmospheric pressure. The fraction boiling between 214° and 220° was collected as the desired product, and was chiefly dodecene.

*Part B.*—A charge of 1100 grams of dodecene, prepared in Part A above, while being agitated, was warmed to 49° to 51° and into the warm agitated material, a stream of chlorine vapor was passed at the rate of about 2 grams per minute. After three hours and twenty minutes, the gain in weight of the chlorinated mixture was 363 grams. The chlorination was continued for an additional 53 minutes; then a current of air was passed through the chlorinated hydrocarbons for 10 minutes to remove dissolved chlorine and hydrogen chloride. The gain in weight of the hydrocarbon was 465 grams.

The chlorinated hydrocarbon was twice carefully fractionated at 1.5 to 4 mm. mercury absolute pressure, using a Vigreux column. The fraction collected as dodecene dichloride had a boiling range of about 110° to 120° at 2 mm. mercury absolute pressure.

*Part C.*—A mixture of 51.3 grams of granular anhydrous aluminum chloride and 2050 grams of benzene were agitated at room temperature. Then 613 grams of dodecene dichloride prepared in Part B above were run in as a steady stream during the course of about 30 minutes. The temperature was then raised to 44° to 46° and agitation continued for 1 hour. The temperature was then allowed to fall to room temperature and the mixture agitated for about 16 hours longer. The condensation reaction mixture was decanted from the solid aluminum chloride residue.

The condensation reaction mixture was distilled. Unreacted benzene was removed by distilling first at atmospheric pressure and then at 40 mm. mercury absolute pressure until the vapor temperature was 80°. The residual distillant was then subjected to repeated fractional distillation. Two main fractions were isolated. One of these, fraction A, boiled at 154° to 171° at 4 mm. and weighed 221 grams. The other, fraction B, boiled at 203° to 220° (at 4 mm.) and weighed 154 grams. Fraction A was largely a mixture of alkylated benzenes in which the hydrocarbon groups introduced by alkylation contained 12 carbon atoms in a chain and two of the carbon atoms of a chain were directly linked to two adjacent carbon atoms of the benzene nucleus to form a cyclic compound having a formula of the type formula set out above, herein termed for convenience "cyclododecylene benzenes." Fraction B, on the other hand, was largely di(phenyl) laurane.

*Part D.*—100 grams of fraction A (see Part C of this example) were mixed with 125 grams of 100% sulfuric acid at a temperature between 30° and 35°. The mixture was then warmed to 55° and agitated at that temperature for 1 hour. It was then allowed to stand for 2 hours during which time two layers formed. The lower layer was spent sulfuric acid. It was drawn off and discarded. The upper layer was chiefly sulfonated "cyclododecylene benzenes" which was drowned in ice water, neutralized with aqueous caustic soda (50%) and dried on a rotary double drum drier. The drums had an external diameter of 6 inches and were chromium plated. They were rotated at a speed of 3 to 4 revolutions per minute and were heated internally to a temperature of about 150° C. by steam under about 60 lbs. gauge pressure. The flaky, light-colored product had excellent detergent properties.

*Example 10.*—*Part A.*—A large batch of Pennsylvania kerosene (boiling range 140° to 266° with over 80% boiling between 200° and 260°) was fractionally distilled, and the various fractions having similar boiling ranges were combined and refractionated. Finally two fractions were isolated, No. 1 from 245° to 250°, and No. 2, boiling from 250° to 255°, both at atmospheric pressure. Each fraction was warmed to 50°, agitated in a glass flask and chlorinated by passing in chlorine vapor until the gains in weight corresponded, respectively, to 100% (for No. 1) and 108% (for No. 2) of the gain in weight theoretically required for conversion of the hydrocarbons completely into their monochlorinated derivatives. Both chlorinated hydrocarbon products were fractionally distilled. On distilling chlorinated fraction No. 1, a fraction boiling up to 145° at 20 millimeters of mercury absolute pressure was obtained. This comprised unchlorinated hydrocarbons and was therefore rechlorinated to the extent of 100% of theoretical monochlorination using the same procedure as before. The chlorinated fractions from No. 1 were then redistilled several times and fractions boiling as follows were isolated:

I. Up to 153° at 20 mm__ 50 g. (unchlorinated hydrocarbons)
II. 153° to 163° at 20 mm__ 153 g. (monochlorinated hydrocarbons)
III. Above 163° at 20 mm__ 146 g. (polychlorinated hydrocarbons)

Fraction II thus obtained was the kerosene used in Part B of this example. The mixture obtained on chlorinating fraction No. 2 (boiling range 250° to 255°) was fractionally distilled several times, and the fraction boiling above 163° at 20 mm. of mercury absolute pressure was collected. This was combined with the 146 grams of polychlorinated hydrocarbon material obtained from No. 1, and the resulting mixture fractionally distilled. A fraction boiling from 175° to 185° at 20 mm. of mercury was the dichlorinated kerosene used in Part B of this example. The fraction boiling above 185° at 20 mm. of mercury was the higher polychlorinated kerosene used in Part B of this example.

*Part B.*—The above-described mono-, di- and higher polychlorinated kerosenes (designated keryl chlorides) were condensed with phenol using anhydrous zinc chloride as catalyst. The details of these condensation experiments are given in the following summary:

minutes, the chlorine stream was discontinued and a current of air was passed through the chlorinated hydrocarbon mixture for 5 minutes to remove uncombined dissolved chlorine. The gain in weight due to organically combined chlorine was 308 grams. The specific gravity of the chlorinated hydrocarbon was 1.0216 at 24°.

791 grams of chlorinated hydrocarbon material prepared as described above were distilled using a one-foot column filled with Berl saddles. Fractional distillation was carried out at atmospheric pressure to effect separation of the low-boiling material (caprylene and octyl chloride) and at a pressure of 30 mm. of mercury to isolate the caprylene dichloride fraction which boiled within the range 192° at atmospheric pressure to 120° at 30 mm. A two-foot glass column filled with Berl saddles was then used in insuring complete removal of material boiling below 100° at 30 mm.

*Part B.*—1735 grams of benzene and 43.3 grams of granular anhydrous aluminum chloride were agitated and 400 grams of caprylene dichloride (prepared as described above) were run in as a slow stream during the course of half an hour. The reaction mixture was then warmed to 45° during the course of 5 minutes and agitated at 44° to 46° for 1 hour, and then at about 24° for about 16 hours. The reaction mixture was then allowed to stand for about 2 hours. Tar which separated out was discarded. The crude reaction product was then fractionally distilled, first at atmos-

|  | Run I | Run II | Run III |
|---|---|---|---|
| A mixture consisting of | 150 g. keryl monochloride, 150 g. phenol, 130 g. zinc chloride. | 75 g. keryl dichloride, 100 g. phenol, 75 g. zinc chloride. | 90 g. keryl higher polychloride, 300 g. phenol, 25 g. zinc chloride. |
| Was agitated in a glass flask and heated to reflux during. | 30 minutes | 20 minutes | 20 minutes. |
| The reaction mixture was then refluxed for. | 5 hours at about 170° | 4 hours at reflux temperature | 3 hours at reflux temperature. |
| The crude condensation product was washed with. | 10% HCl | 10% HCl | 10% HCl. |
| The crude washed product was then fractionally distilled under an absolute pressure of. | 4 mm. mercury | 4 mm. mercury | 3 mm. mercury. |
| Three fractions were collected in each case. | 140–175°, 18 g.<br>175–220°, 68 g.<br>220–250°, 7 g. | 140–175°, 6 g.<br>175–220°, 39 g.<br>220–250°, 6 g. | 160–175°, 3 g.<br>175–220°, 26 g.<br>220–250°, 15 g. |
| These three fractions were combined as purified keryl phenol product. |  |  |  |
| Yield | 93 g | 51 g | 44 g. |
| Yield per 100 g. of kerylchloride | 62 g | 68 g | 49 g. |

Each of the three purified keryl phenol products was sulfonated as follows: 25 grams of keryl phenol product were stirred in a glass flask. 17 cc. of 100% sulfuric acid were run in during about 15 minutes at room temperature. The mixture was then warmed to 80° and agitated for about 25 minutes. The sulfonation mixture was diluted with about 250 cc. of cold water and neutralized with 50% aqueous caustic soda. The neutralized solution was dried on a double drum drier.

The dried products were tested for detergency and scouring power. The results showed that as detergents, the mixture of sulfonates made from the keryl dichloride was definitely superior to the mixtures of sulfonates made from the keryl monochloride and from the keryl higher polychloride and the mixture of sulfonates made from the keryl higher polychlorides was equal to the mixture made from the keryl monochloride.

*Example 11.*—*Part A.*—490 grams of caprylene (having a specific gravity of 0.7204 at 24° and refractive index $N_D^{20}$ of 1.4160) were agitated in a glass flask and treated at 39° to 41° with a stream of chlorine flowing at a rate of about 3 grams per minute. After chlorinating for 104 pheric pressure to remove excess benzene and then at reduced pressure (30 to 10 mm. of mercury absolute pressure) to effect separation of the condensation products. Five fractions were collected at the following temperatures and pressures:

1. 120° at 30 mm. to 130° at 20 mm.
2. 130° to 145° at 20 mm.
3. 145° at 20 mm. to 140° at 10 mm.
4. 140° to 150° at 10 mm.
5. 150° at 10 mm. to 165° at 5 mm.

*Part C.*—100 grams of a composite mixture of Fractions 1, 2 and 3 were mixed with 160 grams of 100% sulfuric acid at a temperature between 30° and 35°. The mixture was warmed to 55° and agitated at that temperature for 1 hour. The sulfonation mixture was poured onto cracked ice and neutralized with 50% aqueous caustic soda. The neutralized solution was dried on a rotary drum drier. The flaky, light-colored product was a good wetting agent in aqueous solution.

It is noted that the products obtained in the above examples all comprise hydrocarbon-substituted aromatic compounds of the peculiar structure above mentioned; namely, a hydrocarbon-substituted aromatic compound having at least 7 carbon atoms in a hydrocarbon radical introduced by alkylation, of which radical two non-aromatic carbons atoms are linked directly to two adjacent carbon atoms of the aromatic nucleus. Further, as is evident from the above examples, hydrocarbon-substituted aromatic sulfonate mixtures which contain an aromatic nucleus doubly linked at adjacent carbon atoms of the nucleus to an aliphatic hydrocarbon radical together with alkylated aromatic sulfonates linked at a single carbon atom of the aromatic nucleus to a single carbon atom of an aliphatic hydrocarbon radical, constitute valuable detergent mixtures.

It will be evident to those skilled in the art that the invention is not limited to the details of the foregoing illustrative examples and that changes can be made without departing from the scope of the invention.

Catalysts may be used to speed up the rate of chlorination. For example, iodine may be added to the hydrocarbon mixture, or phosphorous trichloride vapors may be added to either the chlorine gas or the hydrocarbon mixture. Or, the reacting materials may be exposed to chemically active radiations, e. g., actinic rays, such as sunlight. Although the use of catalysts may frequently be helpful in accelerating the reaction, the scope of this invention is not limited to chlorination processes in which catalysts are used.

The invention furthermore is not limited to treatment of the aromatic compounds disclosed in the above examples but may be employed in connection with the manufacture of other hydrocarbon-substituted aromatic compounds and especially those of mononuclear aromatic hydrocarbons and their simple unsulfonated substitution products. Examples of such compounds are benzene, toluene, diphenyl, phenol, cresol, anisole, phenetole and salicylic acid. Benzene is preferred.

In carrying out the condensation process between the halogenated hydrocarbon material and the aromatic materials, it is necessary to select the aromatic material so that two ortho carbon atoms of the ring or nucleus may become attached to two carbon atoms of the aliphatic hydrocarbon radical, i. e., so that said carbon atoms are susceptible to alkylation.

The yield of desirable alkylated aromatic sulfonates is greatly influenced by the proportion of chlorinated petroleum fraction employed with respect to the amount of aromatic hydrocarbon or unsulfonated derivative thereof used in the preparation of the alkaylated aromatic compounds. Theoretically, in order to obtain complete reaction one mol of aromatic compound must be used per atom of chlorine combined with the petroleum hydrocarbon fraction. In practice an amount of aromatic compound in large molecular excess, preferably about twice the weight of chlorinated petroleum is used, as this favors complete reaction of the chlorinated petroleum with the aromatic body, and permits less decomposition and undesirable by-products in the condensation reaction.

The improved results of the present invention are best effected by a condensation of the chlorinated hydrocarbon and aromatic compound with an amount of anhydrous aluminum chloride which is from 1 to 8 per cent of the weight of chlorinated hydrocarbon charge; a better and preferable proportion is from 2 per cent to 5 per cent. In general, with amounts less than 2 per cent, condensation is retarded, while with amounts larger than 5 per cent there is no marked increase in the rate of condensation and the yield is somewhat decreased, though the quality of condensed product is improved.

The particular manner in which the sulfonation is carried out forms no part of the present invention; this step can be carried out in any suitable manner. For example, sulfuric acids of various strengths such as 66° Bé. sulfuric acid, 100 per cent sulfuric acid, 26 cent oleum and 65 per cent oleum, and chlor-sulfonic acid may be used as sulfonating agents. The sulfonation may be carried out in the presence of inert solvents or diluents, and sulfonation assistants as, for example, the lower fatty acids and their anhydrides, such as acetic acid and acetic anhydride, or the alkali metal sulfates, such as sodium or potassium sulfate, may be employed. Also, the temperature at which the sulfonation is carried out may vary within wide limits. For example, temperatures as low as about 0° C. and as high as about 140° C. may be employed. In general, the more vigorous the sulfonating agent the lower is the preferred temperature. In most cases the sulfonation is carried out most efficiently at temperatures between 5° and 90° C. For complete sulfonation the sulfonating agent in terms of 100 per cent sulfuric acid may be employed in amounts which range from 0.3 to 5 times or more the weight of the condensation product to be sulfonated. Ordinarily, the extent to which the sulfonation is carried out will vary with the individual material being sulfonated, the duration of the sulfonation, and the use to be made of the sulfonated product. Monosulfonation is preferred.

The hydrocarbon-substituted aromatic sulfonates may be prepared in the form of their free sulfonic acids or in the form of their salts. Thus they may be prepared in the form of their alkali metal, alkaline earth metal, ammonium, or organic base salts (e. g., amine salts). They are of particular value in the form of their alkali metal and especially sodium salts.

The temperature of chlorination of the hydrocarbon mixtures may be varied. Thus, temperatures as low as 0° C. or as high as 200° C. may be employed. I have found that it is advantageous to carry out the chlorination of the hydrocarbon mixture, such as a kerosene or "white oil" fraction of petroleum, for the most part, and preferably for substantially the entire chlorination period, at a temperature which is above 40° C., and preferably between 60° C. and 200° C. For the chlorination of kerosene fractions of petroleum distillates, chlorination temperatures of about 60° to 125° C. are employed with advantage. The optimum chlorination temperature varies with the hydrocarbon mixture being chlorinated. In general, the higher boiling mixtures, such as "white oil," are chlorinated efficiently in the neighborhood of 80° C.

Preferably, as practiced in the processes of the above examples, the products resulting from the condensation of mixtures of chlorinated hydrocarbons with aromatic compounds are distilled, preferably under vacuum conditions, to concentrate the desired cyclo-alkylene-aromatic compounds and to separate them from higher boiling compounds such as poly (phenyl) alkanes, and lower boiling compounds such as lower boiling alkanes.

This application is a continuation-in-part of my applications Serial No. 691,082, filed September 26, 1933, now U. S. P. 2,249,757, issued July 22, 1941; Serial No. 257,720, filed February 21, 1939, now U. S. P. 2,267,725, issued December 30, 1941; and Serial No. 329,830, filed April 15, 1940, now U. S. P. 2,247,365, issued July 1, 1941, which is a continuation-in-part of my applications Serial Nos. 737,777, filed July 31, 1934, now U. S. P. 2,196,985, issued April 16, 1940; 93,521, filed July 30, 1936, now U. S. P. 2,283,199, issued May 19, 1942; and 186,231, filed January 21, 1938, now U. S. P. 2,223,364, issued December 3, 1940.

Since changes may be made in the process described above without departing from the scope of the invention it will be understood that the description should be interpreted as illustrative and not in a limiting sense.

I claim:

1. A detergent mixture of hydrocarbon-substituted aromatic sulfonates having at least 7 carbon atoms and an average of 10 to 19 carbon atoms in hydrocarbon radicals introduced by alkylation, in which the said radicals are derived from an aliphatic hydrocarbon mixture of the type of petroleum distillate containing an average of 10 to 19 carbon atoms per molecule, said detergent mixture including hydrocarbon substituted aromatic sulfonates in which a single non-aromatic carbon atom of a hydrocarbon radical introduced by alkylation is linked directly to a carbon atom of the aromatic nucleus and hydrocarbon-substituted aromatic sulfonates in which two non-aromatic carbon atoms of a hydrocarbon radical introduced by alkylation are linked directly to two adjacent carbon atoms of the aromatic nucleus, said detergent mixture being obtained by chlorinating the hydrocarbon mixture to a degree corresponding with more than 100 per cent and not more than 200 per cent chlorination, condensing the resulting mixture of chlorinated hydrocarbons with an aromatic compound having a pair of ortho nuclear carbon atoms susceptible to alkylation, and sulfonating the resulting mixture of hydrocarbon-substituted aromatic compounds.

2. A detergent mixture of hydrocarbon-substituted aromatic sulfonates having at least 7 carbon atoms and an average of at least 10 carbon atoms in hydrocarbon radicals introduced by alkylation, in which the said radicals are derived from a hydrocarbon mixture of the type of a petroleum distillate containing an average of at least 10 carbon atoms per molecule, said detergent mixture including hydrocarbon-substituted aromatic sulfonates in which a single non-aromatic carbon atom of a hydrocarbon radical introduced by alkylation is linked directly to a carbon atom of the aromatic nucleus and hydrocarbon-substituted aromatic sulfonates in which two non-aromatic carbon atoms of a hydrocarbon radical introduced by alkylation are linked directly to two adjacent carbon atoms of the aromatic nucleus, said detergent mixture being obtained by chlorinating the hydrocarbon mixture to a degree corresponding with more than 100 per cent chlorination, condensing the resulting mixture of chlorinated hydrocarbons with an aromatic compound having a pair of ortho nuclear carbon atoms susceptible to alkylation, and sulfonating the resulting mixture of hydrocarbon-substituted aromatic compounds.

3. A detergent mixture of hydrocarbon-substituted aromatic sulfonates having at least 7 carbon atoms and an average of 10 to 19 carbon atoms in hydrocarbon radicals introduced by alkylation, in which the said radicals are derived from a paraffinic petroleum distillate containing an average of 10 to 19 carbon atoms per molecule, said detergent mixture including hydrocarbon-substituted aromatic sulfonates in which a single non-aromatic carbon atom of a hydrocarbon radical introduced by alkylation is linked directly to a carbon atom of the aromatic nucleus and hydrocarbon-substituted aromatic sulfonates in which two non-aromatic carbon atoms of a hydrocarbon radical introduced by alkylation are linked directly to two adjacent carbon atoms of the aromatic nucleus, said detergent mixture being obtained by chlorinating the petroleum distillate to a degree corresponding with more than 110 per cent chlorination and not more than 200 per cent chlorination, condensing the resulting mixture of chlorinated hydrocarbons with an aromatic compound having a pair of ortho nuclear carbon atoms susceptible to alkylation, and sulfonating the resulting mixture of hydrocarbon-substituted aromatic compounds.

4. A detergent mixture of hydrocarbon-substituted benzene sulfonates having at least 7 carbon atoms and an average of 10 to 19 carbon atoms in hydrocarbon radicals introduced by alkylation, in which the said radicals are derived from a hydrocarbon mixture of the type of petroleum distillate containing an average of 10 to 19 carbon atoms per molecule, said mixture including hydrocarbon-substituted benzene sulfonates in which a single non-aromatic carbon atom of a hydrocarbon radical introduced by alkylation is linked directly to a carbon atom of the benzene nucleus and hydrocarbon-substituted benzene sulfonates in which two non-aromatic carbon atoms of a hydrocarbon radical introduced by alkylation are linked directly to two adjacent carbon atoms of the benzene nucleus, said detergent mixture being obtained by chlorinating the hydrocarbon mixture to a degree corresponding with more than 100 per cent chlorination, condensing the resulting mixture of chlorinated hydrocarbons with benzene, and sulfonating the resulting mixture of hydrocarbon-substituted benzenes.

5. A detergent mixture of hydrocarbon-substituted aromatic sulfonates in which hydrocarbon radicals introduced by alkylation are derived from the hydrocarbon constituents of a petroleum fraction boiling within the range 180° to 300° C. at atmospheric pressure, said mixture including hydrocarbon-substituted aromatic sulfonates in which a single non-aromatic carbon atom of a hydrocarbon radical introduced by alkylation is linked directly to a carbon atom of the aromatic nucleus and hydrocarbon substituted aromatic sulfonates in which two non-aromatic carbon atoms of a hydrocarbon radical introduced by alkylation are linked directly to two adjacent carbon atoms of the aromatic nucleus, said mixture being obtained by chlorinating the petroleum fraction to a degree corresponding with more than 100 per cent chlorination and not more than 200 per cent chlorination, condensing the resulting mixture of chlorinated hydrocarbons with an aromatic compound having a pair of ortho nuclear carbon atoms susceptible to alkylation, and sulfonating the resulting mixture of hydrocarbon-substituted aromatic compounds.

6. A detergent mixture of hydrocarbon-substituted benzene sulfonates in which hydrocarbon radicals introduced by alkylation are derived from the hydrocarbon constituents of a paraffinic petroleum fraction boiling within the range 180° to 300° C. at atmospheric pressure, said mixture including hydrocarbon-substituted benzene sulfonates in which a single non-aromatic carbon atom of a hydrocarbon radical introduced by alkylation is linked directly to a carbon atom of the benzene nucleus and hydrocarbon-substituted benzene sulfonates in which two non-aromatic carbon atoms of a hydrocarbon radical introduced by alkylation are linked directly to two adjacent carbon atoms of the benzene nucleus, said mixture being obtained by chlorinating the petroleum fraction to a degree corresponding with more than 110 per cent chlorination and not more than 200 per cent chlorination, condensing the resulting mixture of chlorinated hydrocarbons with benzene, and sulfonating the resulting mixture of hydrocarbon-substituted benzenes.

LAWRENCE H. FLETT.